US011606696B2

(12) United States Patent
Rodriguez Bravo et al.

(10) Patent No.: US 11,606,696 B2
(45) Date of Patent: Mar. 14, 2023

(54) SECURITY MECHANISM FOR WIRELESS AUTHENTICATION DEVICES (71) Applicant: KYNDRYL, INC., New York, NY (US)

(72) Inventors: Cesar Augusto Rodriguez Bravo, Alajuela (CR); Franz Friedrich Liebinger Portela, San Pablo de Heredia (CR); David Alonso Campos Batista, Aurora (CR)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/338,732

(22) Filed: Jun. 4, 2021

(65) Prior Publication Data
US 2022/0394486 A1 Dec. 8, 2022

(51) Int. Cl.
H04W 12/63 (2021.01)
H04W 12/08 (2021.01)
(Continued)

(52) U.S. Cl.
CPC ........ H04W 12/63 (2021.01); G07C 9/00309 (2013.01); G07C 9/00563 (2013.01);
(Continued)

(58) Field of Classification Search
CPC ..... H04W 12/63; H04W 12/03; H04W 12/08; G07C 9/00309; G07C 9/00563; G07C 2009/00412; H04L 9/0643; H04L 2209/80
See application file for complete search history.

(56) References Cited

U.S. PATENT DOCUMENTS 8,106,747 B2   1/2012  Nguyen
8,712,407 B1   4/2014  Cope
(Continued)

FOREIGN PATENT DOCUMENTS

EP      2864967 B1    4/2019
JP   2001295524 A    10/2001
(Continued)

OTHER PUBLICATIONS

Disclosed Anonymously, "Apparatus for Secure Car Lock," IP.com Prior Art Database Technical Disclosure, Dec. 13, 2017, 4 pages, https://priorart.ip.com/IPCOM/000252014.
(Continued)

Primary Examiner — Nabil H Syed
(74) Attorney, Agent, or Firm — Dan Housley; Andrew M. Calderon; Calderon Safran & Cole, P.C.

(57) ABSTRACT

Location-based validation of a wireless authentication device. A request is received by a security hardware computing device for an action requiring authentication in connection with security hardware. A security hardware location is received or accessed. A wireless authentication device location of a wireless authentication device in possession of a requester is received by security hardware computing device. The security hardware computing device receives a mobile device location for a mobile device in possession of the requester. The security hardware computing device determines whether the security hardware location, the mobile device location, and the wireless authentication device location are in a proximity. The security hardware computing device performs the action requiring authentication in connection with the security hardware.

20 Claims, 5 Drawing Sheets (51) Int. Cl.
    *H04W 12/03*      (2021.01)
    *G07C 9/00*       (2020.01)
    *H04L 9/06*       (2006.01)
(52) U.S. Cl.
    CPC .......... *H04L 9/0643* (2013.01); *H04W 12/03*
         (2021.01); *H04W 12/08* (2013.01); *G07C*
             *2009/00412* (2013.01); *H04L 2209/80*
                                          (2013.01)

(56) References Cited

U.S. PATENT DOCUMENTS

| | | | |
|---|---|---|---|
| 9,369,287 | B1 | 6/2016 | Sarvestani |
| 9,406,178 | B2 | 8/2016 | Pukari |
| 9,426,653 | B2 | 8/2016 | Becker |
| 9,855,918 | B1* | 1/2018 | Melaragni ............... B60R 25/24 |
| 9,865,002 | B2 | 1/2018 | Anand |
| 10,255,738 | B1* | 4/2019 | Fernandez ......... G07C 9/00563 |
| 10,576,932 | B2 | 3/2020 | Yakovenko |
| 2005/0099263 | A1 | 5/2005 | Ikeda |
| 2015/0074800 | A1* | 3/2015 | Farraro ................... H04W 4/80 726/20 |
| 2016/0316367 | A1 | 10/2016 | Rose |
| 2016/0321846 | A1* | 11/2016 | Pham ....................... G07C 9/20 |
| 2017/0106834 | A1* | 4/2017 | Williams ............ H04W 12/069 |
| 2017/0180388 | A1* | 6/2017 | Belz .................... H04L 63/0853 |
| 2019/0043282 | A1* | 2/2019 | Hyde .................... A61B 5/0059 |
| 2019/0366978 | A1 | 12/2019 | Woo |
| 2021/0206350 | A1* | 7/2021 | Henderson ............ H04W 4/023 |

FOREIGN PATENT DOCUMENTS

| | | | |
|---|---|---|---|
| JP | 2002077972 | A | 3/2002 |
| JP | 4739985 | B1 | 8/2011 |

OTHER PUBLICATIONS

Kado et al., "Redtacton Near-body Electric-field Communications Technology and Its Applications," [accessed on Apr. 27, 2021], Retrieved from the Internet, 5 pages, https://www.ntt-review.jp/archive/ntttechnical.php?contents=ntr201003sf1.html.

Mell et al., "The NIST Definition of Cloud Computing," National Institute of Standards and Technology, Special Publication 800-145, Sep. 2011, pp. 1-7.

* cited by examiner

SECURITY MECHANISM FOR WIRELESS AUTHENTICATION DEVICES

FIELD OF THE INVENTION

The present invention relates generally to wireless authentication devices, such as used to access automobiles, doors, public transportation access points, etc. and more particularly to an improved security mechanism for wireless authentication devices.

BACKGROUND

The present embodiments relate to an improved security mechanism for wireless authentication devices, commonly known to the public at large as key fobs, access control key fobs, remote keyless systems, keyless entry, electronic keys, security tokens, and otherwise (referred to herein as "wireless authentication devices"). Wireless authentication devices use a variety of electromagnetic spectrum-based technologies to authenticate a user, confirming, in effect, that the user possesses the wireless authentication device, in order to perform an action such as unlocking a car door, starting a car, unlocking an apartment door, entering a subway, etc. Various techniques used by wireless authentication devices include transmission of infrared signals, passive rfid tags, or transmission of other radio frequencies which are unique to the wireless authentication device, electromagnetic "handshakes," challenge-response authentication, or other, more advanced techniques for authentication, but the underlying electromagnetic-based technology remains essential.

Unfortunately, though as technology employed by criminals improves, however, it becomes within reach of the ordinary criminal, to easily copy or clone the unique electromagnetic signal used by each wireless authentication device with advanced technology. Criminals who clone these signals, therefore, will be able to bypass security measures and steal a car, enter an apartment, enter a subway terminal, etc. The problem of cloning of signals used by wireless authentication devices is confronted with embodiments of the invention presented herein.

SUMMARY

Embodiments of the present invention disclose a method, system, and computer program product for location-based validation of a wireless authentication device. A request is received by a security hardware computing device for an action requiring authentication in connection with security hardware. A security hardware location is received or accessed by the security hardware computing device. A wireless authentication device location of a wireless authentication device in possession of a requester is received by security hardware computing device. The security hardware computing device receives a mobile device location for a mobile device in possession of the requester. The security hardware computing device determines whether the security hardware location, the mobile device location, and the wireless authentication device location are in a proximity. The security hardware computing device performs the action requiring authentication in connection with the security hardware.

DETAILED DESCRIPTION

For the past several decades, wireless authentication devices have advanced to a point allowing a small radio-frequency transmitting devices to be carried in a user's pocket and replace ordinary metal keys which have been used for centuries in unlocking doors, and performing other functionality. As discussed above, however, improvements in technology also allow potential criminals to easily clone wireless authentication devices, and access security hardware protected by the wireless authentication device. "Security hardware" may, in various embodiments of the invention, be an electronically controlled actuator for a door lock, an electronic ignition relay for starting a car, a magnetic lock for preventing entrance to a condominium building, a turnstile for preventing access to a subway, a computer in a locked state, or any other mechanism for performing an action which requires authentication by a wireless authentication device. Presented is an improved security mechanism for wireless authentication devices, providing for further authentication of wireless authentication devices.

Embodiments of the invention are directed towards a method, system, and computer program product for location-based validation of a wireless authentication device. The presently disclosed embodiments may be used in any situation requiring further authentication of a wireless authentication device so long as location-based information is available, such as from near-field technology, a global positioning system, cell phone tower triangulation, or other electronic information providing a location of the user.

Figure 1:
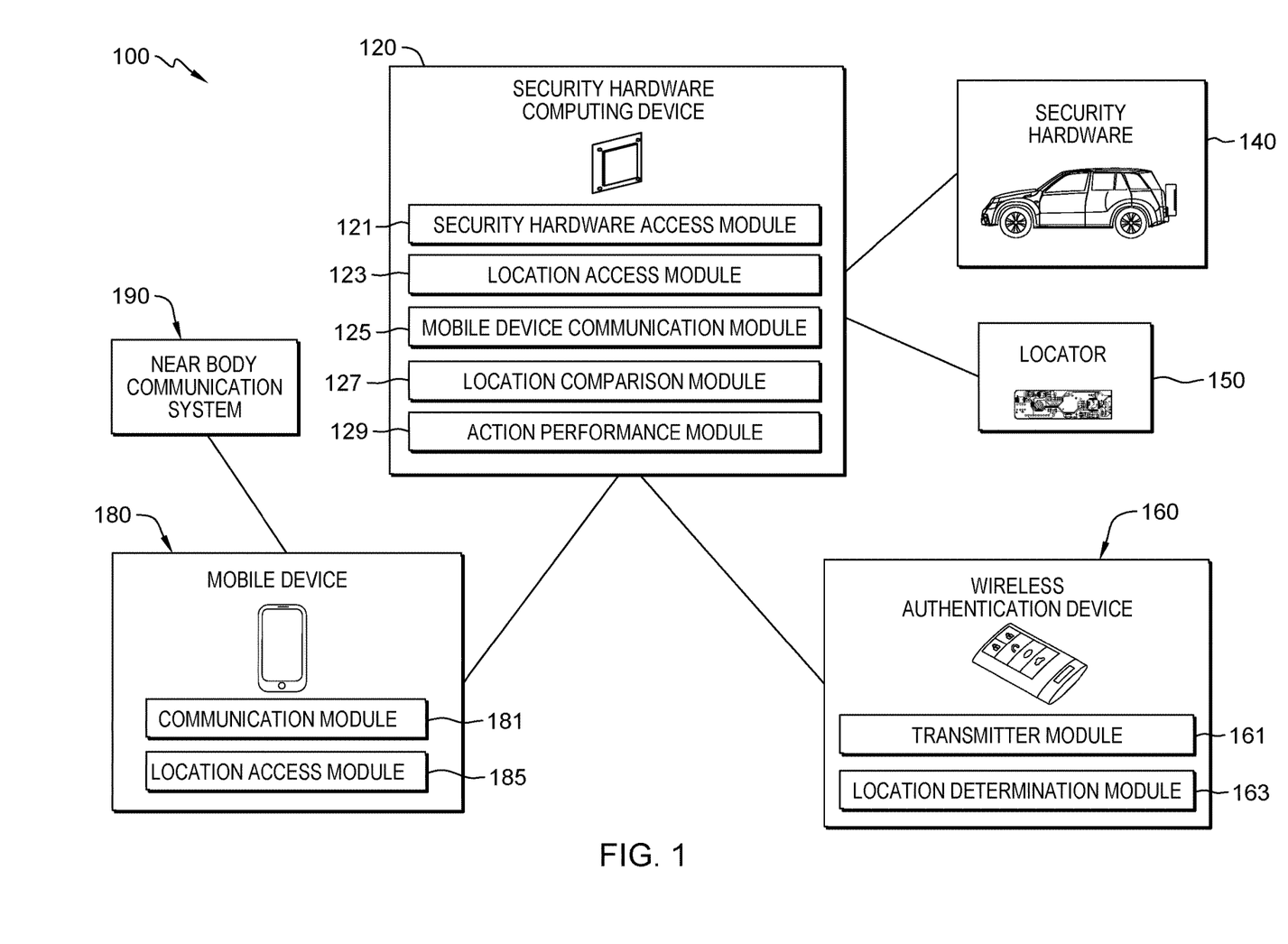
FIG. 1 is a functional block diagram illustrating an environment 100 for location-based validation of a wireless authentication device, in accordance with an embodiment of the present invention.

FIG. 1 is functional block diagram illustrating an environment 100 for location-based validation of a wireless authentication device. In an exemplary embodiment, a security hardware computing device 120 is operatively connected with security hardware 140. In connection with FIG. 1, security hardware 140 displayed is a car, but various "security hardware" to which access/functionality is controlled by security hardware computing device 120 is contemplated as within the scope of the invention. Various functionality associated with a car may be controlled, in-part, by security hardware computing device 120, such as a car door lock for locking a car door, a car ignition for starting the car, a tailgate actuator or relay for opening a hands-free tailgate, etc. In alternative embodiments of the invention (as discussed elsewhere herein), security hardware 140 may be a lock controlling access to an apartment building, a lock for a turnstile to enter a subway, a computer which needs to be unlocked, etc., all of which are controlled by security hardware computing device 120. As displayed in FIG. 1, security hardware computing device 120 is also operatively connected to locator 150, which provides a real-time location of the security hardware 140 (and, in the exemplary embodiment, also a location of the security hardware computing device 120 itself), for utilization in authentication, as further discussed herein. The location provided by locator 150 may be a location within a near-body electric field as discussed further herein, a location provided by other near-field technology, a gps location, or any other means for providing a location in an electronic fashion. In alternative embodiments of the invention, a real-time location for security hardware computing device 120 is provided in another way, such as via triangulation of cell phone towers, or another geolocation means, as determined by locator 150.

As further shown in connection with FIG. 1, security hardware computing device 120 is also in communication with a wireless authentication device 160 (here, displayed is a key fob), such as held by a user trying to enter his or her car. In some embodiments, the user may have to press a button on the wireless authentication device 160 to perform various functionality in connection with security hardware 140, such as unlocking car door locks or powering the car's ignition relay to start the car, (in requesting an action requiring authentication in connection with the security hardware 140, as discussed further herein), or the wireless authentication device 160 needs to be in a vicinity of the security hardware computing device 120. In various embodiments of the invention, the user may request performance of various different actions in connection with the security hardware 140, depending upon the nature of the security hardware 140 (if it is a door lock, car, turnstile, safe, locked computer, etc.), as well as the desires of the user, and all are contemplated as being within the scope of embodiments of the presently disclosed invention. The wireless authentication device 160, in various embodiments of the invention, may also provide a near-field technology-based location, a gps-based location, or other geolocation information, for further utilization as discussed herein. Finally, security hardware computing device 120 is also in communication with a mobile device 180 in the possession of a user, such as a cell phone, personal digital assistant, laptop, smartwatch, etc., which has a capability of determining its location, such as within an electromagnetic field generated by near-body communication technology, other near-field communication technology, via an integrated gps device, cell phone tower triangulation, etc. In the exemplary embodiment, security hardware computing device 120, after receiving location data from the locator 150, wireless authentication device 160, and mobile device 180, determines whether locations provided by all three are in a proximity (such as within 1-5 meters). If the security hardware computing device 120 determines this to be true, and the security hardware computing device 120 performs the action. By determining that the security hardware 140, wireless authentication device 160, and the mobile device 180 are all in a proximity, a "spoofing" attack is avoided since it is much more difficult for a potential criminal to clone all three signals, as well as their location, rather than merely allowing cloning of an electromagnetic signal generated by the wireless authentication device 160. Further embodiments of this invention, further increase the security of wireless authentication device 160, and are discussed herein.

In further embodiments of the invention, mobile device 180 is also operatively connected to a near body communication system 190, associated with one or more sensor(s) in direct contact with a body of a user. The near body communication system 190 transmits a "near-body electric field," as further discussed herein. The near body communication system 190, based upon the near-body electric field, in this embodiment, provides biosensory information which is used to further authenticate the user, such as by providing unique vital signs indicating that the user is nearby, and in communication with the mobile device 180 (such as by detecting current coming from a body of the user). Biosensory information provided from near body communication system 190 may be used alternatively or in addition to geolocation information obtained from near body communication system 190 used in authentication, as further discussed herein.

Discussing elements displayed in FIG. 1 in further detail, displayed is security hardware computing device 120. Security hardware computing device 120 represents hardware and/or associated software for performance of various functionality in connection with embodiments of the presently disclosure, such as a dedicated computer processing unit executing instructions, a microchip, an embedded system, or the equivalent capable of performing functionality described herein. Security hardware computing device 120 possesses capabilities, in various embodiments of the invention, to unlock a car door, power an ignition relay (to start a car), operate a hands-free tailgate (in embodiments where the security hardware 140 is an apartment door), operate a turnstile for a subway (in embodiments where the security hardware 140 is subway turnstile), unlock a computer (in embodiments where the security hardware 140 is a computer), etc. All of these "security hardware" usages are contemplated as within the scope of the presently disclosed invention. Security hardware computing device 120, in various embodiments of the invention, receives via security hardware access module 121 a request from a wireless authentication device 160 to perform an action associated with security hardware 140, if the request is authenticated as further discussed herein. Optionally, in various embodiments, a near-body electrical field, geolocation, or other location-based information of wireless authentication device 160 is also received by security hardware access module 121, which serves to further indicate a location of the user in possession of the wireless authentication device 160. In performance of various embodiments of the invention, after the request requiring authentication is received, location access module 123 of security hardware computing device 120 accesses a near-body electrical field location/other near field technology location/gps location/other geolocation of the security hardware 140 (such as provided by a locator 150), and all are contemplated within the scope of the invention. Security hardware computing device 120, in various embodiments of the invention, communicates via mobile device communication module 125 with a nearby mobile device 180 to receive a near-body electrical field location/other near field technology location/mobile device gps location/geolocation for a mobile device 180 also in possession of user, who has requested the action requiring authentication (as further discussed herein). In the various embodiments (and depending upon which embodiment is being considered), after receipt of one or more of near-body electrical field location/other near field technology location/ gps location/geolocation data of one or more of wireless authentication device 160, and/or mobile device 190, the security hardware computing device 120 compares one or both of these with location data of the security hardware 140 to determine if all of the location data available indicates that these three data points are within a proximity (such as within 1-5 meters). If this is true, the security hardware computing device 120 is able to complete the location-based validation and authentication, and commands the security hardware 140 to complete the action, such as unlocking car door locks, starting the car, opening the lift gate, opening an apartment door, operating a turnstile, unlocking a computer, etc., as further discussed herein. In various embodiments of the invention, in order to maintain privacy and security, security hardware computing device 120 requests received, near-body electrical field location/other near field technology location/gps location/geolocation data received, and/or any other data received from locator 150, wireless authentication device 160, and/or mobile device 180 is received in encrypted or hashed format and then decrypted by security hardware computing device 120. Security hardware computing device 120 may alternatively receive such requests/location data/other data and encrypt or hash the data itself, in preserving privacy and security. As further discussed herein, in still further embodiments biosensory information is also received by security hardware computing device 120 and used in further authenticating a user, as further discussed herein.

Also shown in FIG. 1, is wireless authentication device 160, representing hardware and/or software for requesting performance of actions associated with security hardware computing device 120, as well as, in various embodiments, providing near-body electrical field location/other near field technology location/gps location/geolocation information, or other location information associated with a holder of the device (in embodiments where this data is utilized). Wireless authentication device 160 may be, by non-limiting example, in various embodiments be a key fob, an access control key fob, a remote keyless system, a keyless entry device, an electronic key, a security token, etc. In embodiments where wireless authentication device 160 is associated with a car, requesting an action by the wireless authentication device 160 may involve a user pressing a button on wireless authentication device, which causes wireless authentication device 160 to transmit a signal to security hardware computing device 120 to request, by non-limiting example, to unlocking of car doors, operating a hands-free tailgate, starting a car, etc. In embodiments where wireless authentication device 160 is associated with an apartment door lock or a subway turnstile, user may need to simply place wireless authentication device 160 in a vicinity of a receiver to "request" an action (such as with near field technology).

In the various embodiments, wireless authentication device 160 may communicate with security hardware computing device 120 via infrared signals, passive rfid tags, or transmission of other radio frequencies which are unique to the wireless authentication device, utilize electromagnetic "handshakes," challenge-response authentication, etc., and all such technologies are contemplated in the scope of the present invention. Wireless authentication device 160 via transmitter module 161 issues a request to the security hardware computing device 120 for performance of an action involving authentication, as discussed. In embodiments of the invention where wireless authentication device 160 provides location data, the wireless authentication device 160 accesses such location information via the location determination module 163, such as via a locally available global positioning system, via mobile device 180, etc. The location data is used by security hardware computing device 120 for authentication, as further discussed herein, in connection with various embodiments. In alternative embodiments of the invention, other location information, such as near-body electrical field location/other near field technology location (other than a specific gps location or geolocation) is transmitted by the wireless authentication device 160 to the security hardware computing device 120. Location information, in various embodiments, is simply made available from wireless authentication device 160 to the security hardware computing device 120 by being in a vicinity of security hardware computing device 120, since by the nature of the electromagnetic signals transmitted by the wireless authentication device 160 and the power level of transmitter module 161, such signals could not propagate very far, and thus location information is simply transmitted by security hardware computing device 120 being able to receive the request from the wireless authentication device. Note, in various embodiments of the invention, transmissions from wireless authentication device 160 are transmitted in an encrypted and/or hashed fashion (to be decrypted or dehashed by the security hardware computing device 120).

Continuing, as shown in more detail in FIG. 1 is mobile device 180. Mobile device 180 represents a mobile computing device (such as a cellular telephone, smartphone, smart watch, personal digital assistant, tablet computer, laptop, mobile phone, satellite phone, etc.) possessing capabilities for performance of functions as described herein. Mobile device 180, in various embodiments of the invention, in equipped via communication module 181 to communicate wirelessly with security hardware computing device 120 via wi-fi, wi-max, any sort of internet/network connection, near-field technology (to provide a near field technology location, as further discussed herein), or communicate via any presently existing or after-arising equivalents. Location access module 185, in various embodiments, obtains a near-body electrical field location/other near field technology location/gps location/geolocation/other location where mobile device 180 is presently, based, in various embodiments, on capabilities of near field technology, accessing of an attached gps chip, cell phone tower triangulation, accessing an external locator (such as locator 150), etc. Once location access module 185 has obtained the location data, in various embodiments communication module 181 is used to transmit the obtained location data to security hardware computing device 120, for utilization as further discussed herein. In various embodiments of the invention, communications from communication module 181 are encrypted and/or hashed, to protect privacy of data.

In further embodiments of the invention, mobile device 180 is associated a near body communication system 190, associated with one or more biological sensors which measure biosensory data associated with a user. In these embodiments of the invention, the one or more biological sensors capture biosensory information associated with a user, such as electrical signals associated with a human nervous system, heartbeat, stress response, or other biosensory information. Near body communication system 190 may utilize capacitive and/or resistive sensors in measuring biosensory information, which are, in turn, connected via a wired connection or wirelessly to near body communication system 190 and mobile device 180. Electrical signals measured by the one or more biological sensors are transmitted from near body communication system 190 to mobile device 180. The biosensory information provided in the electrical signals measured is used by the security hardware computing device 120 in further authentication of the user, in effect confirming that the user is in a close proximity to the mobile device 180, to confirm the user is actually the one making the request for the action requiring authentication in connection with the security hardware. As discussed in connection with other embodiments, data transmitted from near body communication system 190 and/or mobile device 180 is encrypted and/or hashed, to be decrypted or dehashed by security hardware computing device 120 upon receipt.

Figure 2A:
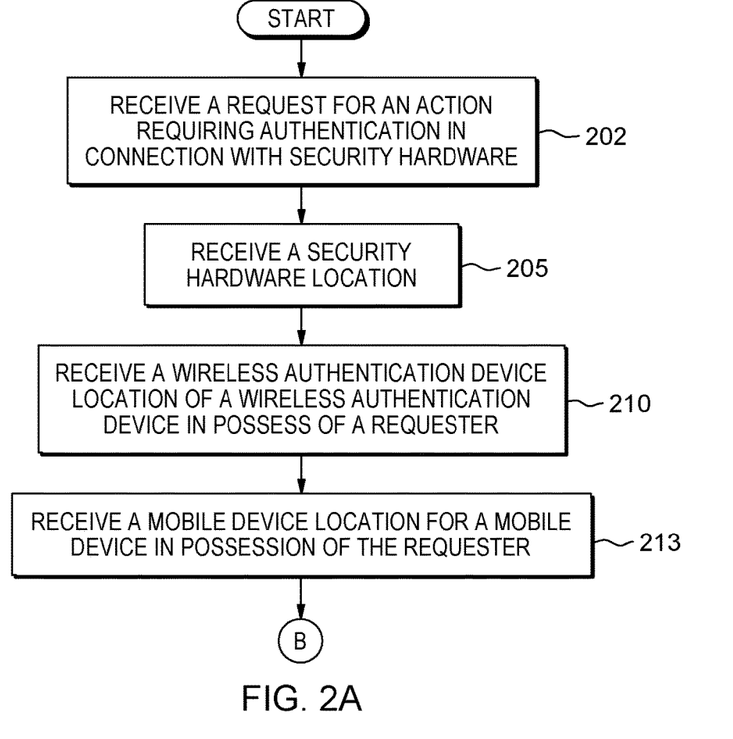
FIGS. 2A and 2B are a flowchart depicting operational steps that may be executed for location-based validation of a wireless authentication device, in accordance with an embodiment of the invention.
Figure 2B:
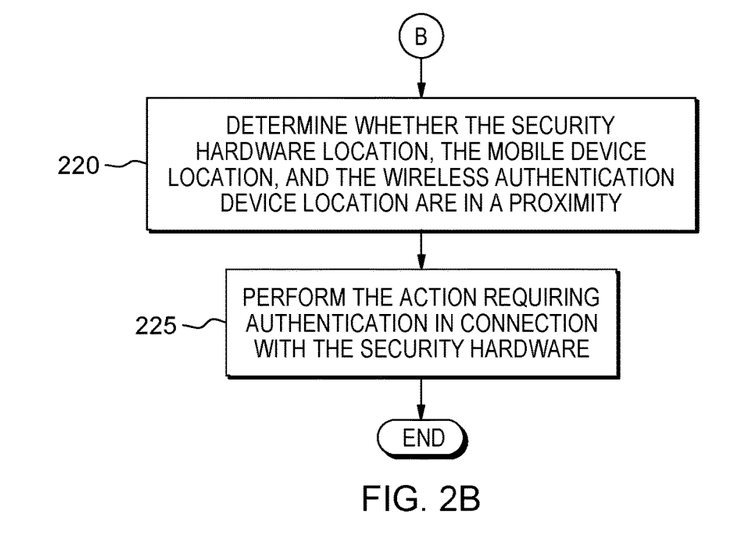

FIGS. 2A and 2B are a flowchart depicting operational steps that may be executed for location-based validation of a wireless authentication device 160, in accordance with an embodiment of the invention. As shown in FIG. 2A, at step 202 security hardware computing device 120 receives a request for an action requiring authentication in connection with security hardware 140. The request for the action can come, in various embodiments of the invention, from wireless authentication device 160 or mobile device 180. At step 205, the security hardware computing device 120 receives a security hardware location from locator 150. At step 210, security hardware computing device 210 receives a wireless authentication device 160 location of a wireless authentication device 160 in possession of the requester. At step 213, security hardware computing device 210 receives a mobile device 180 location, noting the mobile device 180 is in the possession of the requester, to perform the authentication discussed in various embodiments of the invention.

Continuing with regard to FIG. 2B, at step 220, the security hardware computing device 120 compares the security hardware location (obtained from locator 150), the mobile device location (obtained from mobile device 180), with the wireless authentication device 160 location, in order to determine whether these three are within a range (such as within 1-5 meters). If so, the security hardware computing device 120 authenticates the requester, and performs the action requiring authentication in connection with the security hardware 140 (such as unlocking the car door, starting the car engine, etc., as further discussed herein). In various embodiments of the invention, other authentication steps may take place as well, such as determining whether an authentication code transmitted by wireless authentication device 160 is correct.

Figure 3:
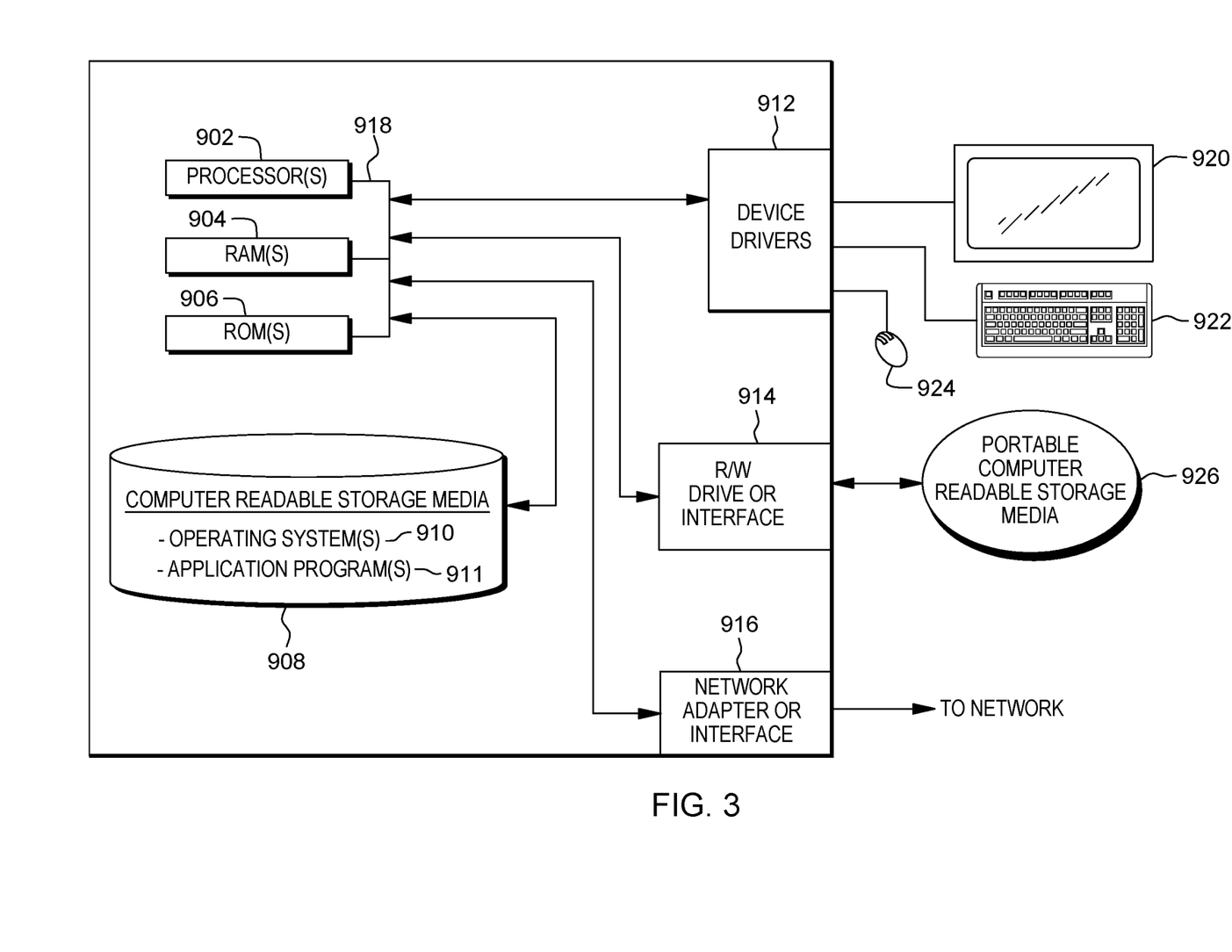
FIG. 3 depicts a block diagram of components of security hardware computing device 120, wireless authentication device 160, and mobile device 180 of FIG. 1, in accordance with an embodiment of the present invention.

FIG. 3 depicts a block diagram of components of security hardware computing device 120, wireless authentication device 160, and mobile device 180 in the environment 100 for location-based validation of a wireless authentication device, in accordance with an embodiment of the present invention. It should be appreciated that FIG. 3 provides an illustration of one implementation and does not imply any limitations with regard to the environments in which different embodiments may be implemented. Many modifications to the depicted environment may be made.

Security hardware computing device 120, wireless authentication device 160, and mobile device 180 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment 100 for location-based validation of a wireless authentication device, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Security hardware computing device 120, wireless authentication device 160, and mobile device 180 may also include a R/W drive or interface 914 to read from and write to one or more portable computer readable storage media 926. Application programs 911 on computing device 106 may be stored on one or more of the portable computer readable storage media 926, read via the respective R/W drive or interface 914 and loaded into the respective computer readable storage media 908.

Security hardware computing device 120, wireless authentication device 160, and mobile device 180 may also include a network adapter or interface 916, such as a TCP/IP adapter card or wireless communication adapter (such as a 4G wireless communication adapter using OFDMA technology). Application programs 911 on security hardware computing device 120, wireless authentication device 160, and mobile device 180 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Security hardware computing device 120, wireless authentication device 160, and mobile device 180 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
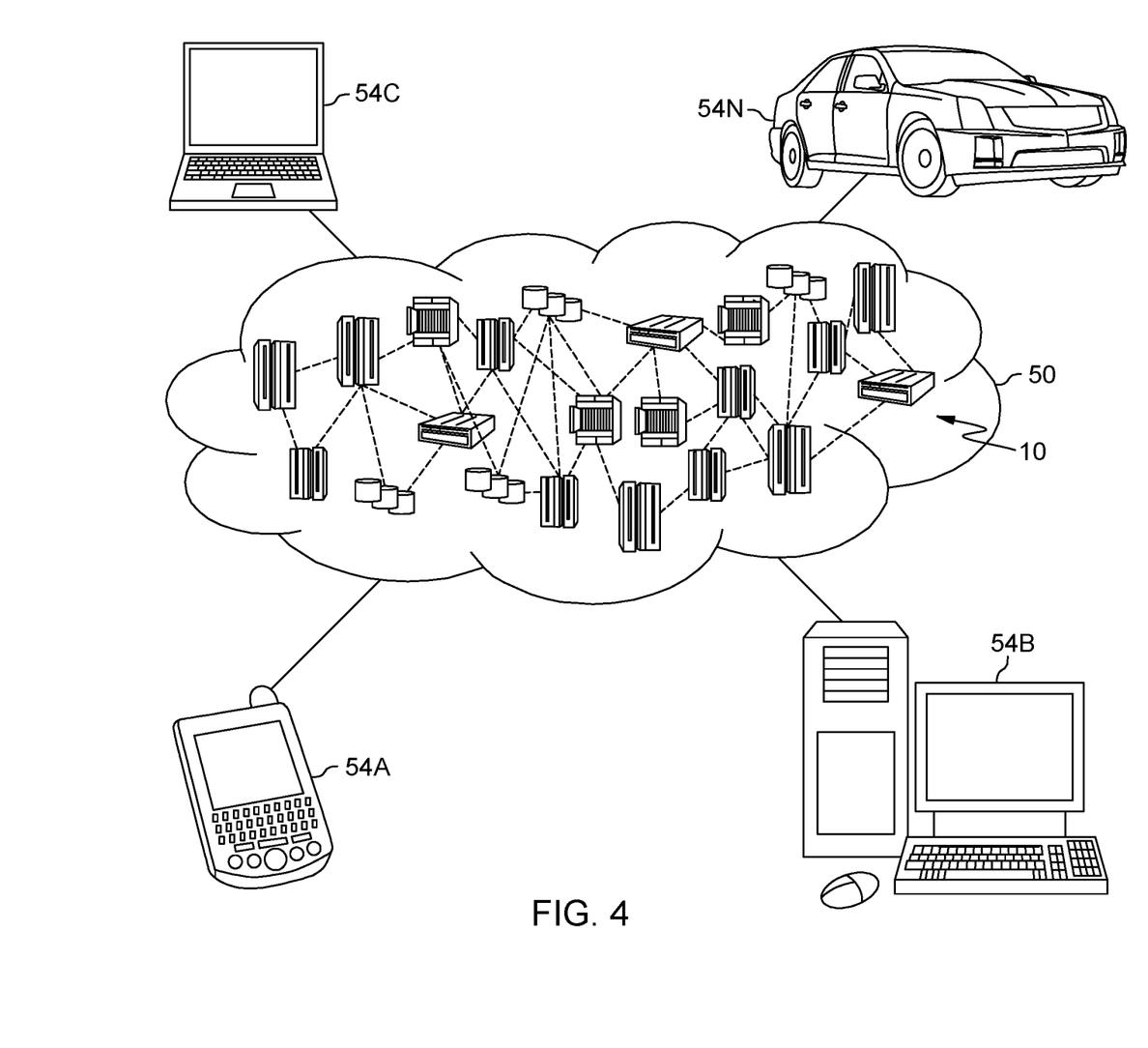
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
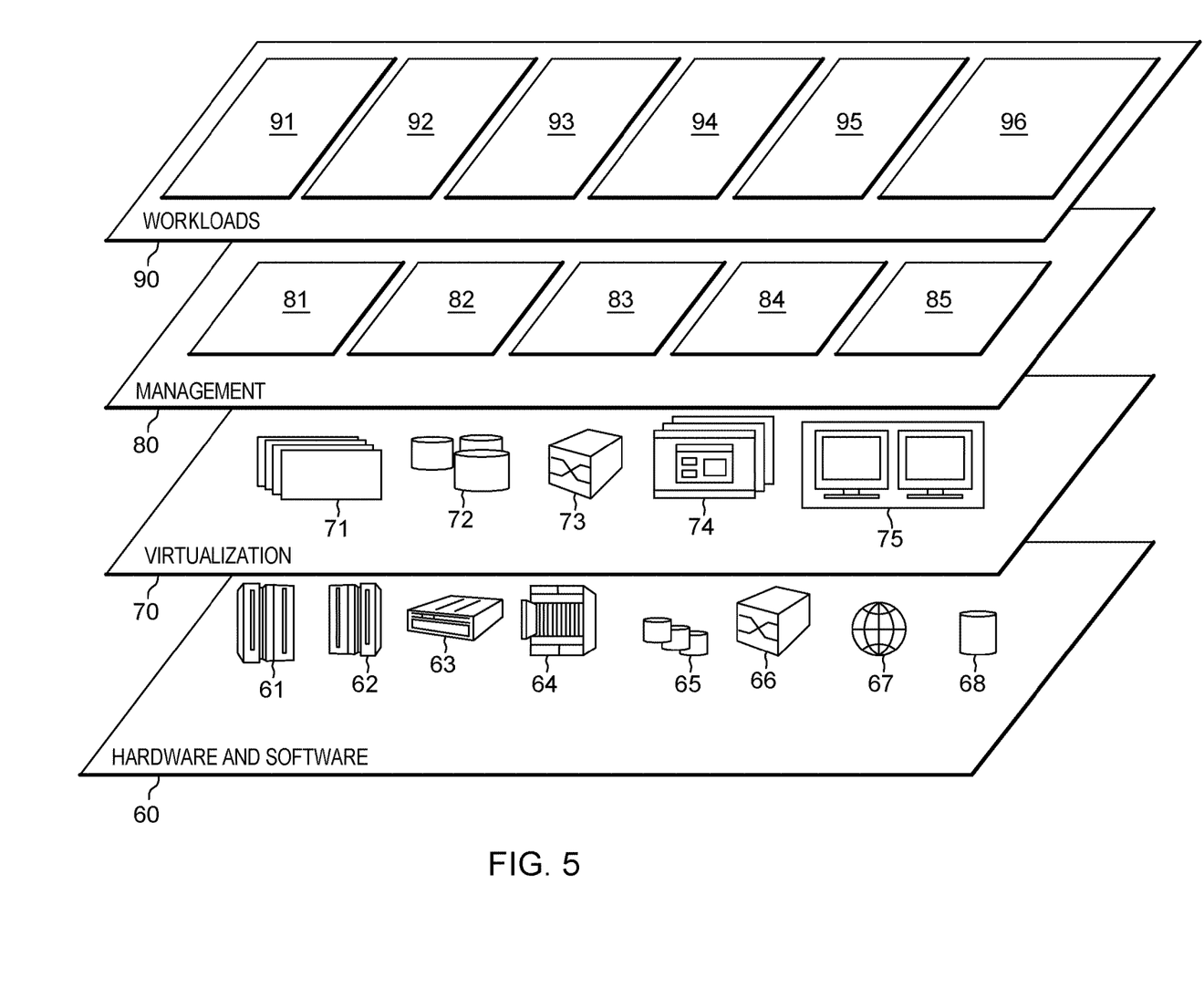
FIG. 5 depicts abstraction model layers, in accordance with an embodiment of the present invention.

Referring now to FIG. 5, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment 100 for location-based validation of a wireless authentication device.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method utilizing a security hardware computing device for location-based validation of a wireless authentication device, the method comprising:
   receiving by a security hardware computing device a request for an action requiring authentication in connection with security hardware;
   receiving by the security hardware computing device a security hardware location;
   receiving, from a wireless authentication device in possession of a requester, by the security hardware computing device a wireless authentication device location of the wireless authentication device;
   receiving, from a mobile device in possession of the requester, by the security hardware computing device a mobile device location for the mobile device;
   decrypting by the security hardware computing device the mobile device location and the wireless authentication device location;
   determining by the security hardware computing device whether the security hardware location, the mobile device location, and the wireless authentication device location are in a proximity; and
   performing by the security hardware computing device the action requiring authentication in connection with the security hardware.

2. The method of claim 1, wherein the mobile device location and the wireless authentication device location are hashed upon transmission or receipt.

3. The method of claim 1, wherein the mobile device location and the wireless authentication device location are encrypted upon transmission or receipt.

4. The method of claim 1, wherein the request for the action requiring authentication is received by the security hardware computing device from the wireless authentication device.

5. The method of claim 4, wherein the request for action requiring authentication received by the security hardware computing device is further authenticated by a capacitive sensor in contact with the requester.

6. The method of claim 1, further comprising receiving from the mobile device biosensory information associated with the requester.

7. The method of claim 6, wherein the biosensory information is used by the security hardware computing device to further authenticate the requester.

8. A computer system for location-based validation of a wireless authentication device, the computer system comprising:
   one or more computer processors;
   one or more computer-readable storage media;
   program instructions stored on the computer-readable storage media for executing by a least one of the one more processors, the program instructions comprising:
   program instructions to receive by a security hardware computing device a request for an action requiring authentication in connection with security hardware;
   program instructions to receive by the security hardware computing device a security hardware location;
   program instructions to receive, from a wireless authentication device in possession of a requester, by the security hardware computing device a wireless authentication device location of the wireless authentication device;
   program instructions to receive, from a mobile device in possession of the requester, by the security hardware computing device a mobile device location for the mobile device;
   program instructions to decrypt by the security hardware computing device the mobile device location and the wireless authentication device location;
   program instructions to determine by the security hardware computing device whether the security hardware location, the mobile device location, and the wireless authentication device location are in a proximity; and
   program instructions to perform by the security hardware computing device the action requiring authentication in connection with the security hardware.

9. The computer system of claim 8, wherein the request for the action requiring authentication is received by the security hardware computing device from the wireless authentication device.

10. The computer system of claim 9, wherein the request for action requiring authentication received by the security hardware computing device is further authenticated by a capacitive sensor in contact with the requester.

11. The computer system of claim 8, further comprising program instructions to receive from the mobile device biosensory information associated with the requester.

12. The computer system of claim 11, wherein the biosensory information is used by the security hardware computing device to further authenticate the requester.

13. A computer program product using a computing device for location-based validation of a wireless authentication device, the computer program product comprising:
   one or more non-transitory computer-readable storage media and program instructions stored on the one or more non-transitory computer-readable storage media, the program instructions, when executed by the computing device, cause the computing device to perform a method comprising:
   receiving by a security hardware computing device a request for an action requiring authentication in connection with security hardware;
   receiving by the security hardware computing device a security hardware location;
   receiving, from a wireless authentication device in possession of a requester, by the security hardware computing device a wireless authentication device location of the wireless authentication device;
   receiving, from a mobile device in possession of the requester, by the security hardware computing device a mobile device location for the mobile device;
   decrypting by the security hardware computing device the mobile device location and the wireless authentication device location;
   determining by the security hardware computing device whether the security hardware location, the mobile device location, and the wireless authentication device location are in a proximity; and performing by the security hardware computing device the action requiring authentication in connection with the security hardware.

14. The computer program product of claim 13, wherein the request for the action requiring authentication is received by the security hardware computing device from the wireless authentication device.

15. The computer program product of claim 14, wherein the request for action requiring authentication received by the security hardware computing device is further authenticated by a capacitive sensor in contact with the requester.

16. The computer program product of claim 13, further comprising receiving from the mobile device biosensory information associated with the requester.

17. The computer program product of 16, wherein the biosensory information is used by the security hardware computing device to further authenticate the requester.

18. The method of claim 7, wherein the biosensory information received from the mobile device and used by the security hardware computing device to further authenticate the requester comprises electrical signals associated with a human nervous system, heartbeat, and stress response.

19. The method of claim 18, wherein the electrical signals associated with the human nervous system, heartbeat, and stress response are measured by one or more biological sensors connected via a wired connection or wirelessly to a near body communication system, and transmitted from the near body communication system to the mobile device.

20. The method of claim 19, wherein data transmitted from the near body communication system is encrypted, the method further comprising decrypting by the security hardware computing device the data transmitted from the near body communication system.

* * * * *